US005718356A

United States Patent [19]

Nottingham et al.

[11] Patent Number: 5,718,356

[45] Date of Patent: Feb. 17, 1998

[54] DISPENSING APPARATUS FOR HOT MELT MATERIALS THAT EMPLOYS MICROWAVE ENERGY

[75] Inventors: John R. Nottingham, Hunting Valley; John Spirk, Moreland Hills; Craig M. Saunders, Rocky River; Paul E. Brokaw, Euclid, all of Ohio; Bernard M. Malofsky, Bloomfield; Richard T. Thompson, Haddam, both of Conn.; Cynthia R. Jaros, Kirtland, Ohio

[73] Assignee: Nottingham-Spirk Design Associates, Inc., Cleveland, Ohio

[21] Appl. No.: 250,518

[22] Filed: May 27, 1994

Related U.S. Application Data

[63] Continuation of Ser. No. 20,662, Feb. 22, 1993, abandoned, which is a continuation-in-part of Ser. No. 562,518, Aug. 6, 1990, Pat. No. 5,188,256.

[51] Int. Cl.[6] .............................. B67D 5/62; B23K 15/10

[52] U.S. Cl. ........................ 222/146.5; 219/730; 219/687; 219/759; 219/762

[58] Field of Search ............................ 222/1, 103, 146.5; 219/10.55 A–10.55 R, 730, 762, 687, 759; 426/107, 241–243; 99/DIG. 14; 156/272.2

[56] References Cited

U.S. PATENT DOCUMENTS

| | | | |
|---|---|---|---|
| 2,830,162 | 4/1958 | Copson et al. | 219/10.41 |
| 3,407,077 | 10/1968 | Helin | 99/171 |
| 4,003,840 | 1/1977 | Ishino et al. | 219/10.55 X |
| 4,230,924 | 10/1980 | Brastad et al. | 219/10.55 E X |
| 4,253,898 | 3/1981 | Rinker et al. | 428/520 X |
| 4,267,420 | 5/1981 | Brastad | 219/10.55 E |
| 4,283,427 | 8/1981 | Winters et al. | 219/10.55 R X |
| 4,358,466 | 11/1982 | Stevenson | 426/106 |
| 4,566,804 | 1/1986 | Collins et al. | 219/10.57 X |
| 4,864,090 | 9/1989 | Maxwell et al. | 219/10.55 E |
| 4,906,497 | 3/1990 | Hellmann et al. | 428/49 |
| 4,934,561 | 6/1990 | Ness et al. | 222/146.5 |
| 4,969,968 | 11/1990 | Leatherman | 219/10.55 M X |
| 4,970,358 | 11/1990 | Brandberg et al. | 219/10.55 F |
| 5,002,792 | 3/1991 | Vegoe | 524/916 X |
| 5,012,068 | 4/1991 | Anderson | 219/10.55 M |
| 5,019,680 | 5/1991 | Morino et al. | 219/10.55 E |
| 5,049,714 | 9/1991 | Beresniewicz et al. | 219/10.55 X |
| 5,128,388 | 7/1992 | Komori et al. | 522/95 |
| 5,188,256 | 2/1993 | Nottingham et al. | 222/146.5 X |
| 5,241,150 | 8/1993 | Garvey et al. | 219/10.55 E |

FOREIGN PATENT DOCUMENTS

| | | |
|---|---|---|
| 0421710 | 4/1991 | European Pat. Off. . |
| 0498998 | 8/1992 | European Pat. Off. . |
| 9209503 | 6/1992 | WIPO . |
| 9301247 | 1/1993 | WIPO . |

OTHER PUBLICATIONS

"Browning Methods in Microwave Cooking", Copson et al., *Agriculture and Food Chemistry*, 1955.

"Microwave Foods: New Product Development", Decareau, Food & Nutrition Press, 1992.

*Primary Examiner*—Andres Kashnikow
*Assistant Examiner*—Kenneth R. DeRosa
*Attorney, Agent, or Firm*—Calfee, Halter & Griswold

[57] ABSTRACT

An apparatus for dispensing hot melt adhesive or other materials. The apparatus includes a container and an outlet. The container has a first material (the material to be dispensed) disposed therein, which changes from a solid state or a state of high viscosity to a state of low viscosity when heated above a predetermined temperature. The container also has a second material disposed therein, which is adapted to be heated above a predetermined temperature when subjected to microwaves for at least a predetermined period of time. The second material can be an inner layer of the container, can be applied to a microwave transparent sheet surrounding the first material, or can be embedded in a silicone tube surrounding the first material. The second material is in a heat transfer relationship with the first material. While the dispenser is being subjected to microwaves, the second material converts the microwave energy into heat and transfers the heat to the first material. The first material then changes to a state of low viscosity and can be dispensed from the container through the outlet.

31 Claims, 10 Drawing Sheets

DISPENSING APPARATUS FOR HOT MELT MATERIALS THAT EMPLOYS MICROWAVE ENERGY

TECHNICAL FIELD

The present application is a continuation of application Ser. No. 08/020,662, filed on Feb. 22, 1993, now abandoned, which was a continuation-in-part application of U.S. Ser. No. 07/562,518 filed Aug. 6, 1990, for "Method of Heating and Dispensing Hot Melt Materials That Employs Microwaveable Energy (As Amended)", now U.S. Pat. No. 5,188, 256. This application is a companion case to concurrently-filed U.S. patent application of Hans Haas, Ser. No. 08/020, 511 now abandoned for "Improved Microwaveable Hot Melt Adhesive Dispenser". The present invention relates to an apparatus and a method for dispensing hot melt adhesive or other materials. The apparatus comprises a dispenser which is heated by microwaves and then used to dispense a material therefrom. The dispenser is specifically designed to convert microwave energy into heat and to transfer the heat to the material to be dispensed. The dispenser is particularly useful for heating and dispensing a material (e.g. a hot melt adhesive) which is capable of changing from a solid state or a state of high viscosity to a state of low viscosity when heated above a predetermined threshold temperature, thereby enabling the material to be dispensed when in the state of low viscosity.

BACKGROUND

Conventionally, hot melt adhesive was applied using hot melt adhesive applicators (glue guns). These glue guns were designed to be connected to a wall socket by an electrical cord and plug for continuously applying electrical power to the glue gun, thereby melting the adhesive in the glue gun. This meant that the range over which the glue gun could physically operate was determined by the length of the electrical cord coupling the glue gun to the wall socket. Moreover, the cord at times presented a physical obstacle for a user to maneuver around when using the glue gun.

To solve these problems, a cordless glue gun was designed. A cordless glue gun is a glue gun that can detach from its source of electricity so that it can operate without an electrical cord. In designing a cordless glue gun, significant attention needs to be paid to the support structure for the gun. The support structure must conveniently support the glue gun and enable the glue gun to be electrically energized (heated) while it is on the support structure. Moreover, the support structure and the glue gun need to be designed to enable convenient release Of the glue gun from the support structure and from the source of electricity when it is desired to use the glue gun. Toward these purposes, the support structure includes a socket for transmitting electrical energy to the glue gun and a release mechanism enabling the glue gun to be disconnected from the socket when it is released from the support structure.

Despite the improvements that a cordless glue gun offers over a conventional glue gun, a cordless glue gun still has its drawbacks. Although the cordless glue gun does not require continuous electrical power, it must be initially electrically heated while on the support structure and may require intermittent electrical heating to maintain the hot melt adhesive in a state of low viscosity. Additionally, both the conventional glue gun and the cordless glue gun require hot melt adhesive sticks or other forms of bulk adhesive to be inserted into the glue gun. This requires the purchase of the hot melt adhesive separate from the purchase of the glue gun itself and the handling of the hot melt adhesive before each use of the glue gun. Moreover, both the conventional glue gun and the cordless glue gun are bulky, relatively expensive to purchase, need a relatively long preheating time before glue can be dispensed, and a relatively long cool down period before being stored away.

SUMMARY OF THE INVENTION

The present invention provides a totally new approach to the concept of hot melt adhesive dispensers. The present invention provides a dispenser which is disposable, small, relatively inexpensive, reusable, and capable of being heated in a microwave oven. In addition, the dispenser concept of the invention is also believed to be useful for dispensing a variety of other materials, such as food products (i.e. hard candy, chocolate), solder, wax, and oil.

Generally, the present invention provides a new and useful apparatus and method for dispensing materials capable of changing from a solid state or a state of high viscosity to a state of low viscosity when heated above a predetermined threshold temperature.

In accordance with one embodiment of the present invention, the dispenser includes a first material to be dispensed, a second material in a heat transfer relationship with the first material, a container within which the first material and the second material are disposed, and an outlet through which the first material can be dispensed.

The first material is capable of changing from a solid state or a state of high viscosity to a state of low viscosity when heated above a predetermined temperature. According to this embodiment, this material is a hot melt adhesive. This first material is in a heat transfer relationship with a second material. The second material is adapted to be heated above a predetermined temperature when subjected to microwaves for at least a predetermined period of time. According to the preferred embodiment, this second material is a susceptor.

Both the first material and the second material are disposed within a container. According to this embodiment, the second material surrounds the first material, and preferably forms an inner liner of the container. The first material is dispensed from the container through an outlet. According to the preferred embodiment, the outlet is a nozzle through which the first material can be dispensed (preferably extruded). Additionally, the second material is disposed within the nozzle to ensure sufficient heat in the nozzle for a period of time after the dispenser has been subjected to microwaves. This allows the first material in the nozzle to remain in a state of low viscosity for a longer period of time after the dispenser is removed from the microwave oven.

In accordance with another embodiment of the present invention, the dispenser includes a first material to be dispensed, a second material in heat transfer relationship with the first material, a container for the first material and second material, and an outlet in the container through which the first material can be dispensed.

According to this second embodiment, the first material is also preferably a hot melt adhesive, and the second material is also preferably a susceptor which surrounds the hot melt adhesive. However, according to one form of this embodiment, the susceptor comprises microwave-absorbing particles applied to a microwave transparent sheet surrounding the hot melt adhesive; while according to another form of this embodiment, the susceptor comprises microwave-absorbing particles dispersed or embedded within a silicone tube surrounding the hot melt adhesive.

The outlet for the container in this embodiment is preferably the same as in the first embodiment, i.e., the outlet comprises a nozzle through which the hot melt adhesive can be extruded when in a state of low viscosity, and the susceptor is preferably disposed within the nozzle to ensure sufficient heat in the nozzle when the dispenser is subjected to microwaves.

Another aspect of the invention comprises a special cover for either embodiment of the dispenser. The cover is made of one or more layers of a heat insulating material which does not heat in a microwave oven. The cover forms an insulating jacket which allows the cover and dispenser to be removed as a unit from a microwave oven by gripping the insulating jacket. Also, according to this aspect of the invention, the cover has a flexibility that allows it to be squeezed against the dispenser in order to force the hot melt adhesive through the nozzle of the dispenser. Moreover, according to the preferred embodiment of the invention, the cover provides the dual function of acting as a container for the hot melt adhesive and the susceptor as well as supporting the dispenser in an upright orientation in a microwave oven.

Other features and advantages of the present invention will become apparent from the following detailed description and accompanying drawings which form a part of the specification.

DETAILED DESCRIPTION OF THE PREFERRED EMBODIMENT

Figure 2:
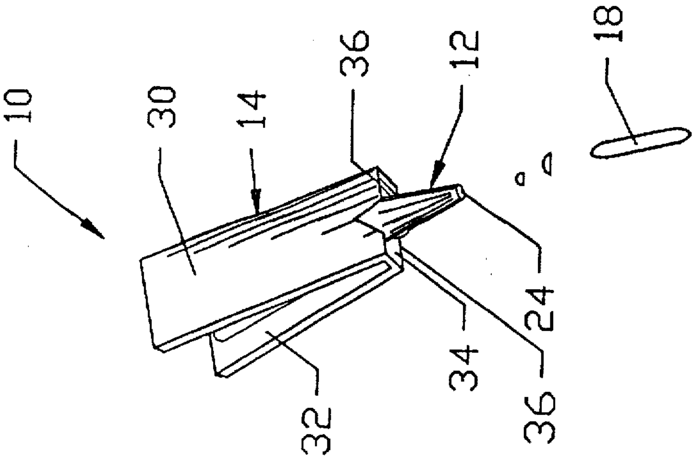
FIG. 2 is a schematic illustration of the dispenser and cover of FIG. 1, showing the manner in which they are used.
Figure 1:
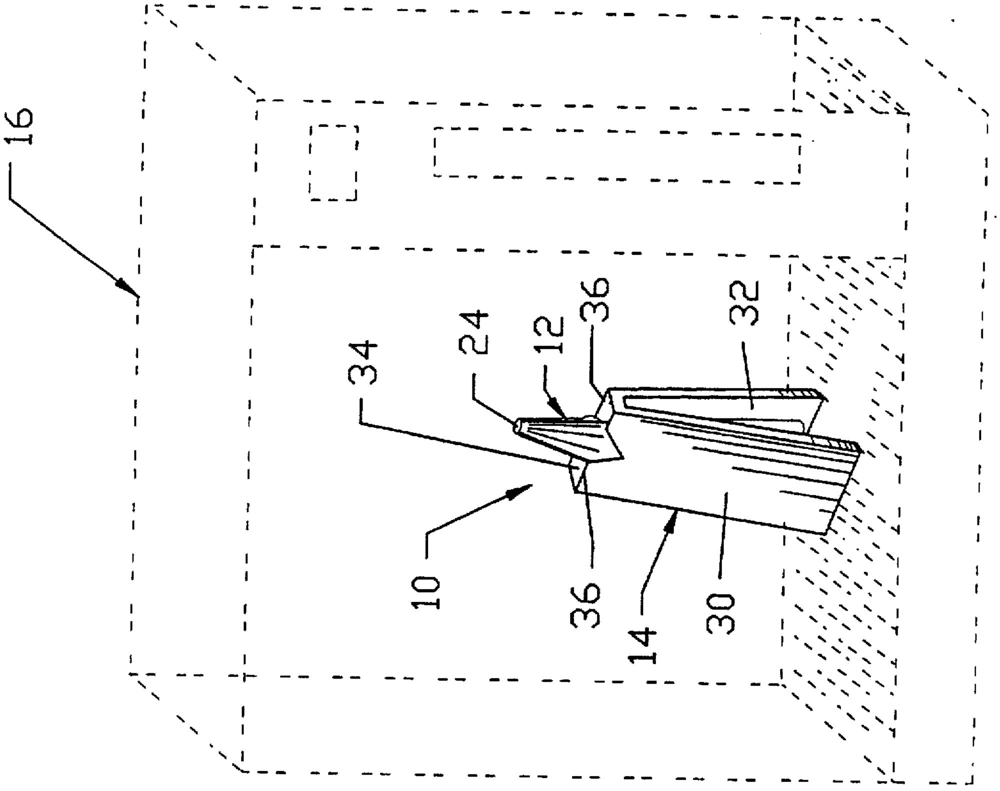
FIG. 1 is a schematic illustration of a dispenser and a cover therefor, constructed according to the principles of this invention, standing upright in a microwave oven as they would be while being heated.
Figure 3:
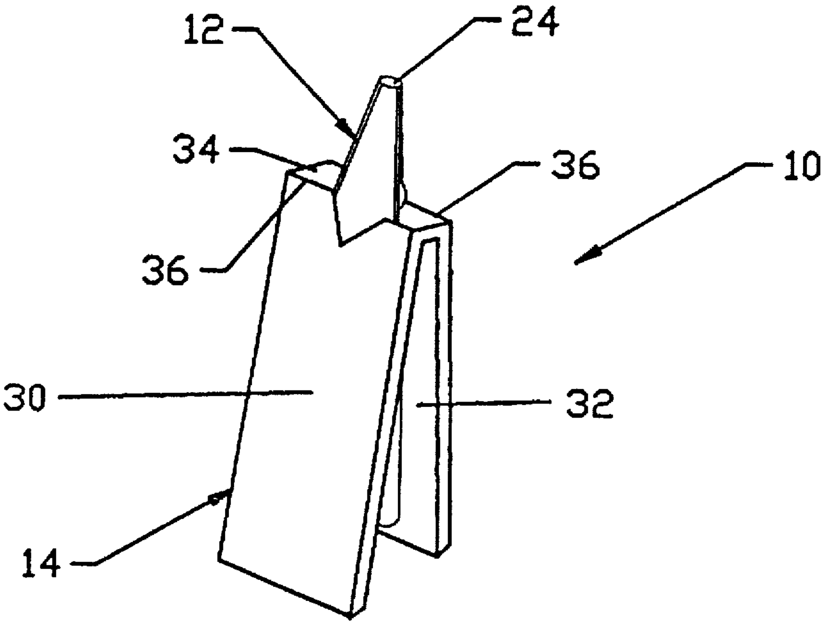
FIG. 3 is an enlarged illustration of the dispenser and cover of FIG. 1.
Figure 4:
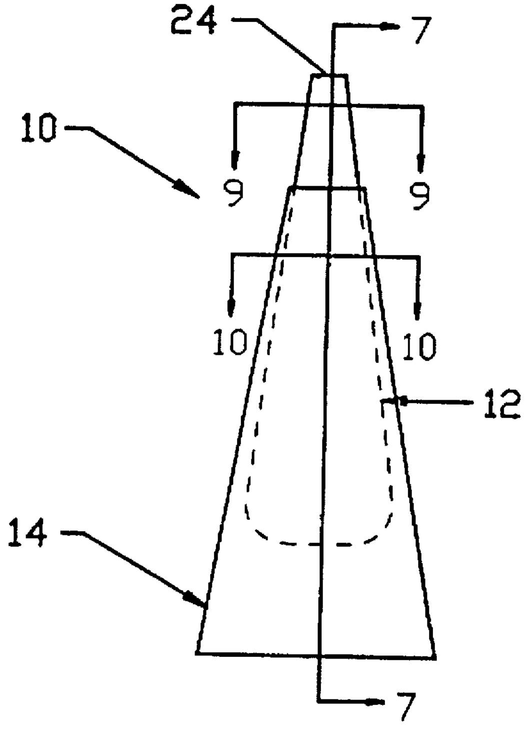
FIG. 4 is a front view of the dispenser and cover of FIG. 1.
Figure 5:
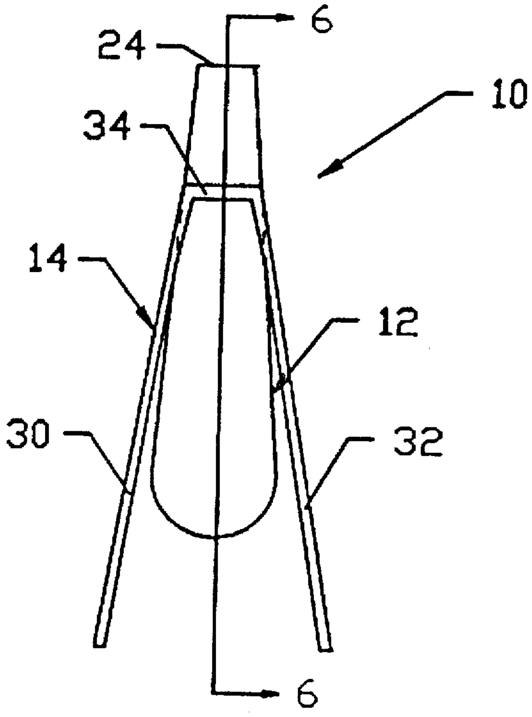
FIG. 5 is a side view of the dispenser and cover of FIG. 3.

Referring to the drawings, and initially to FIGS. 1–12, a dispensing unit 10 includes a dispenser 12 and a cover 14 therefor. The dispenser 12 and the cover 14 are heated in a microwave oven 16, as illustrated in FIG. 1. The cover 14 holds the dispenser 12 in an upright position while being heated in the microwave oven 16. After being heated in the microwave oven 16, the dispenser 12 and the cover 14 are removed from the microwave oven 16 as a unit, and can be used to apply the hot melt adhesive, as illustrated in FIG. 2.

The dispenser 12 includes a first material 18 to be dispensed, a second material 20 in a heat transfer relationship with the first material 18, a container 22 within which the first material 18 and the second material 20 are disposed, and an outlet 24 through which the first material 18 can be dispensed.

The first material 18, the material to be dispensed, is capable of changing from a solid state or a state of high viscosity to a state of low viscosity when heated above a predetermined temperature. Preferably, this material is an adhesive such as a hot melt adhesive. A hot melt adhesive suitable for these purposes is manufactured and sold by the H. B. Fuller Company under the mark/designation Product Number 2125. It is also believed that various other adhesives and other non-adhesive materials may be used with the dispenser of this invention. For example, other adhesives which can be used with the present invention include ethylene vinyl acetate (EVA), polyethylene (PE), polypropylene (PP), polyamide, polyester, polyesteramide, nylon/copolymer and blends of the above. Some examples of other non-adhesive materials are food products (i.e. hard candy, chocolate), solder, wax, and oil.

The second material 20, which is in a heat transfer relationship with the first material 18, is adapted to be heated above a predetermined temperature when subjected to microwaves for at least a predetermined period of time. This material is a susceptor. Exemplary of susceptors are those known elements for use in microwave cooking. One type of susceptor basically comprises metal particles adhered to a film. Susceptors of this type are normally classified by their optical density. Susceptors for use in a dispenser according to this embodiment of the invention can have an optical density in the range of 0.05 to 2.00, with the higher optical density susceptor having greater absorption of microwave energy. Preferably, a susceptor for use in the present invention has an optical density of between 0.10 to 0.35.

A commercially available susceptor which can be used to form a dispenser according to the present invention comprises metal particles disposed on (e.g., applied to) a high temperature polyimide film, and is manufactured and sold by National Metalizing Company, Abeel. Road, Cranbury, N.J. The polyimide film is manufactured and sold by E. I. du Pont de Nemours & Co. under the mark/designation Kapton. The high temperature polyimide film forms a flexible outer layer for the container 22.

The outlet 24, through which the first material 18 is dispensed, preferably forms a nozzle. However, with other forms of dispensers, other forms of outlets may be suitable. For example, if the dispenser had the form of a pitcher, the outlet could have the form of a spout. Preferably, the susceptor coats the entire inside of the dispenser 12, including the nozzle 24. Coating the nozzle 24 with the susceptor helps ensure sufficient heat in the nozzle 24 for a period of time after the dispenser 12 has been heated in a microwave oven 16. This allows the first material 18 in the nozzle 24 to remain in a state of low viscosity for a longer period of time after being removed from the microwave oven 16.

The cover 14 comprises a pair of side members 30, 32 and a central member 34 therebetween. The side members 30, 32 and the central member 34 are integrally formed, and have an integrally formed hinge structure 36 between each side member 30, 32 and the central member 34. Preferably, the cover 14 comprises an opening 38 extending through the central member 34, each hinge structure 36, and through the top portion of each of the side members 30, 32. The opening 38 is dimensioned to allow the nozzle 24 of the dispenser 12 to fit therethrough.

The cover 14 is preferably formed of relatively rigid, heat insulating composite material. Exemplary of an appropriate material for a cover is a composite formed by laminating 1/16 to 3/32 of an inch of polypropylene foam and/or polyethylene foam to a bleached hardwood kraft paper with a thickness of 0.010 to 0.020 of an inch. Polypropylene and polyethylene foam and bleached hardwood kraft paper suitable for these purposes are each well known products and are commercially available from numerous sources.

Figures 6, 7, 8:
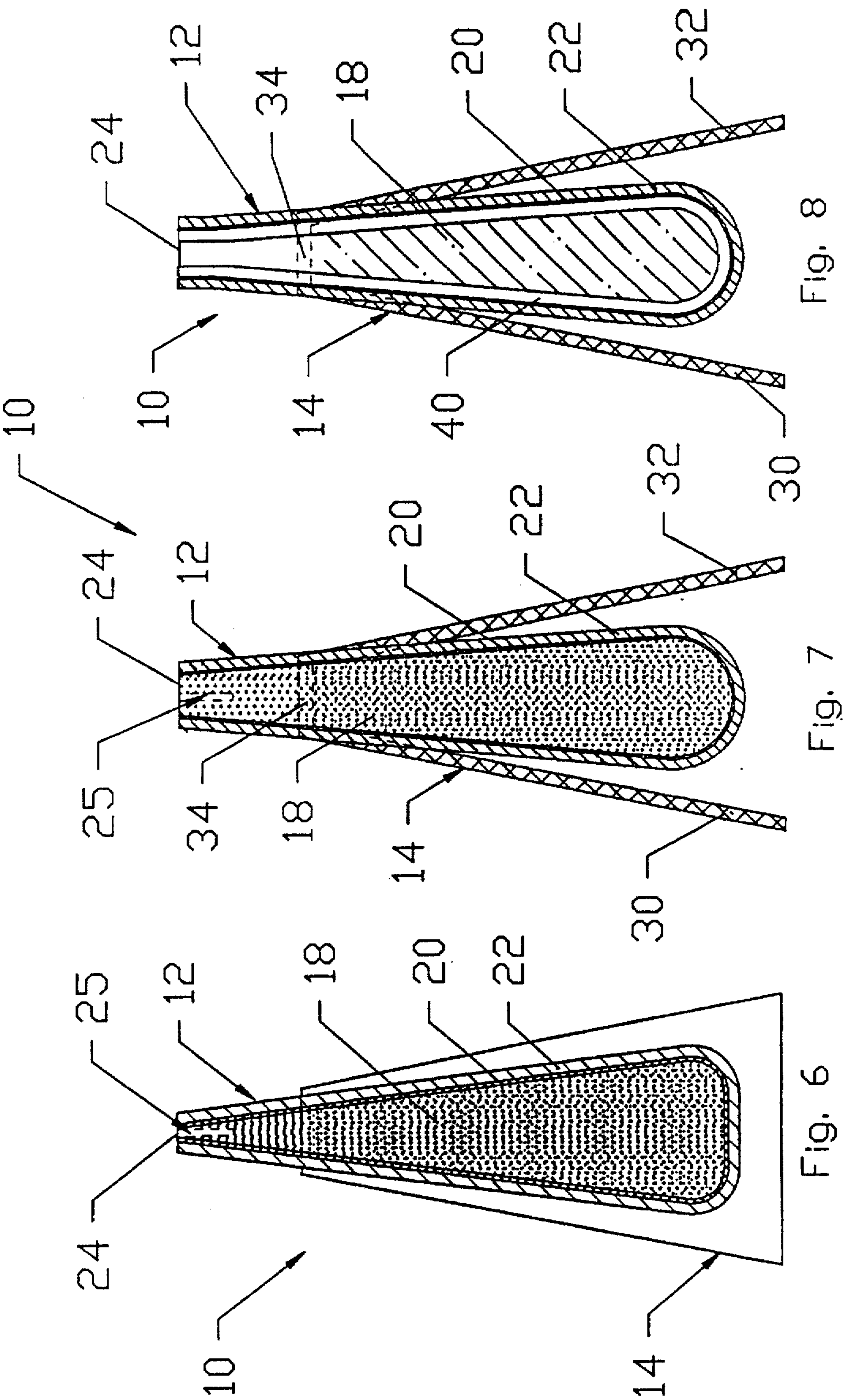
FIG. 6 is a cross-sectional view of the dispenser and cover of FIG. 5, taken along line 6—6.
FIG. 7 is a cross-sectional view of the dispenser and cover of FIG. 4, taken along line 7—7.
FIG. 8 is a cross-sectional view of a dispenser and cover therefor, similar to that in FIG. 7, with the addition of a third material between the first material and the second material in the dispenser.
Figure 10:
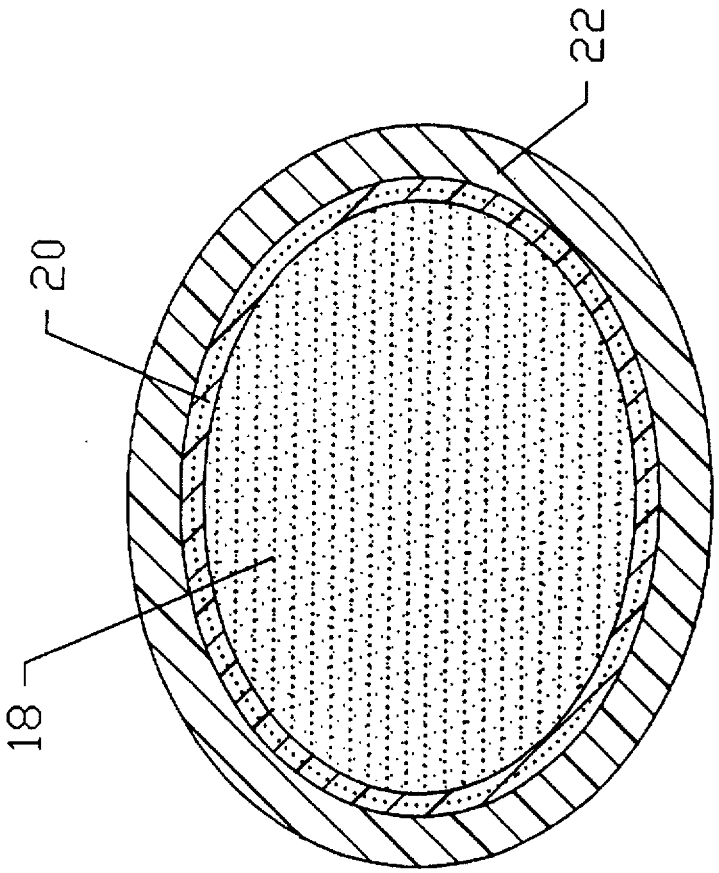
FIG. 10 is a cross-sectional view of the dispenser of FIG. 4, taken along line 10—10.
Figure 9:
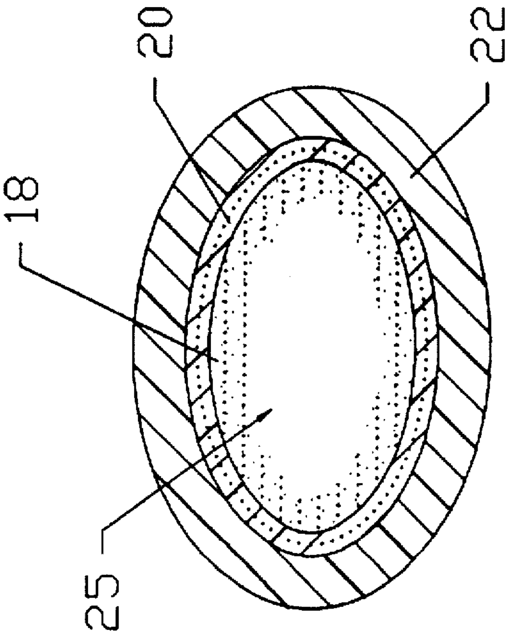
FIG. 9 is a cross-sectional view of the dispenser of FIG. 4, taken along line 9—9.
Figure 11:
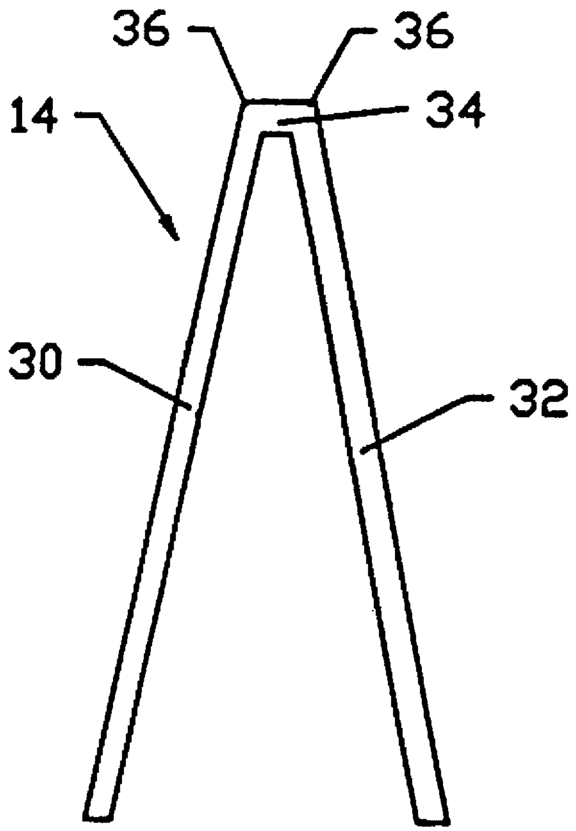
FIG. 11 is a side view of the cover of FIG. 3.
Figure 12:
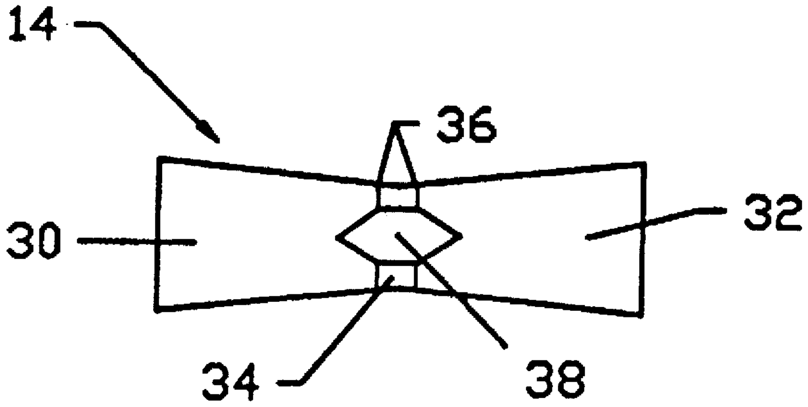
FIG. 12 is a top view of the cover of FIG. 11.

The heat insulating property of the cover 14 prevents burning of a user's hand while the user is handling the dispenser after it has been heated. The rigidity and the design of the side members 30, 32 and the central member 34 forming the cover enables the 14 cover to assume and maintain a generally inverted "V" shaped configuration to support the dispenser 12 in an upright position (nozzle pointed upward) while it is being heated in the microwave oven 16 (see FIG. 1). With hot melt adhesive, it is believed important to leave the nozzle 24 uncovered, so that the hot melt adhesive can be readily applied to an object after the adhesive is heated. Maintaining the dispenser 12 in an upright orientation prevents hot melt adhesive from dripping from the dispenser during the heating process. As illustrated in FIGS. 6 and 7, it is desirable to leave a small central air space 25 in the hot melt adhesive 18 disposed in the nozzle 24, to allow for expansion of the adhesive during heating while minimizing the risk of adhesive inadvertently dripping from the open nozzle during the heating process. The design of the cover also enables the user to use the cover to grasp the dispenser, and the hinge structures 36 provide the cover 14 with a flexibility which enables a user to squeeze the side members 30, 32 against the dispenser 12 to dispense the first material therefrom.

A dispenser according to the invention is preferably designed to heat hot melt adhesive. The hot melt adhesive will have a threshold temperature to which it must be heated in order to change from a state of high viscosity to a state of low viscosity in which it can be extruded from the dispenser. The susceptor is adapted to heat rapidly in a microwave oven to a high enough temperature and to transfer sufficient heat to the hot melt adhesive to change the hot melt adhesive to its low viscosity state. Of course, the particular time that may be required to heat the dispenser in a microwave will depend on factors such as (i) the amount of hot melt adhesive in the dispenser, (ii) the optical density (or efficiency) of the susceptor, and (iii) the power of the microwave oven. With a relatively small amount of adhesive (i.e. an amount suitable for one small home repair application) and a susceptor with an optical density of 0.25 lining the inside of the dispenser, it is believed the dispenser, when disposed in most conventional home microwave ovens (400 W–800 W, 2.45+/−0.05 $GH_z$), will change the hot melt adhesive to its low viscosity state in less than one minute; however, as should be apparent to those skilled in the art, the dispenser could also be disposed in a commercial or industrial-style microwave oven ($900^+$ W, 10 $KH_z$ to 100 $GH_z$) with the same results in even less time.

As previously discussed, it is believed that the concepts of the present invention are applicable to forming disposable dispensers for a variety of materials. In connection with dispensers for some of these materials, it may be desirable to modify the preferred embodiment of the present invention. One possible modification is the addition of a third material 40 disposed within the container 22, between the susceptor 20 and the first material 18 (see FIG. 8). The third material 40 would not impede efficient heat transfer between the susceptor 20 and the first material 18, but would provide a physical layer therebetween. For these purposes, the third layer 40 could be a conventional mylar, Kapton, or silicone layer. This layer could be useful to promote good flow of the first material 18 from the container 22, and/or to provide a barrier between the susceptor 20 and the first material 18 for health reasons (e.g., when the first material is a food product).

While the preferred embodiment and several possible modifications of the present invention have been described in detail, it should be apparent that the concepts of the present invention can be incorporated into dispensers of other constructions and for other materials.

Figure 13:
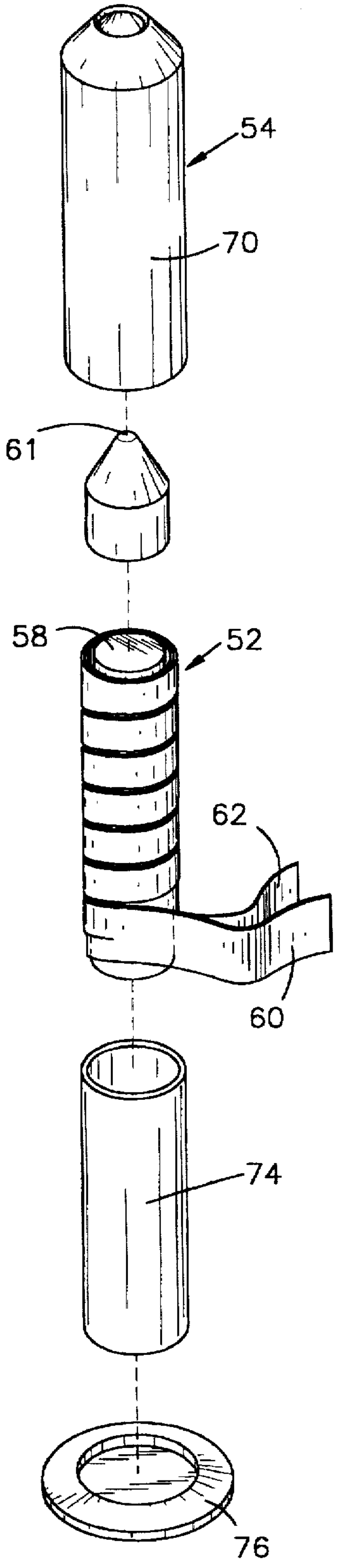
FIG. 13 is a partially assembled schematic illustration of a dispenser and a cover therefor, constructed according to an additional embodiment of the present invention.
Figure 14:
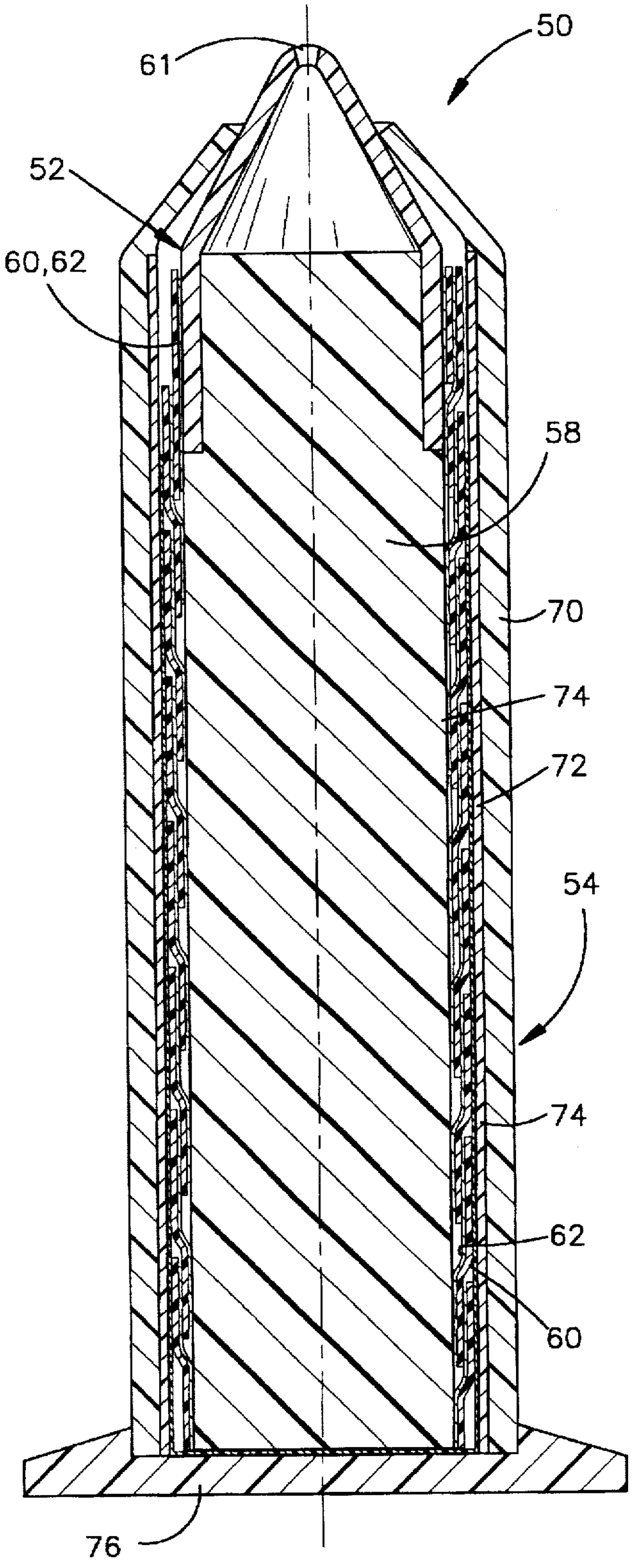
FIG. 14 is a cross-sectional side view of the dispenser and cover of FIG. 13, with the dispenser and cover fully assembled.
Figure 14A:
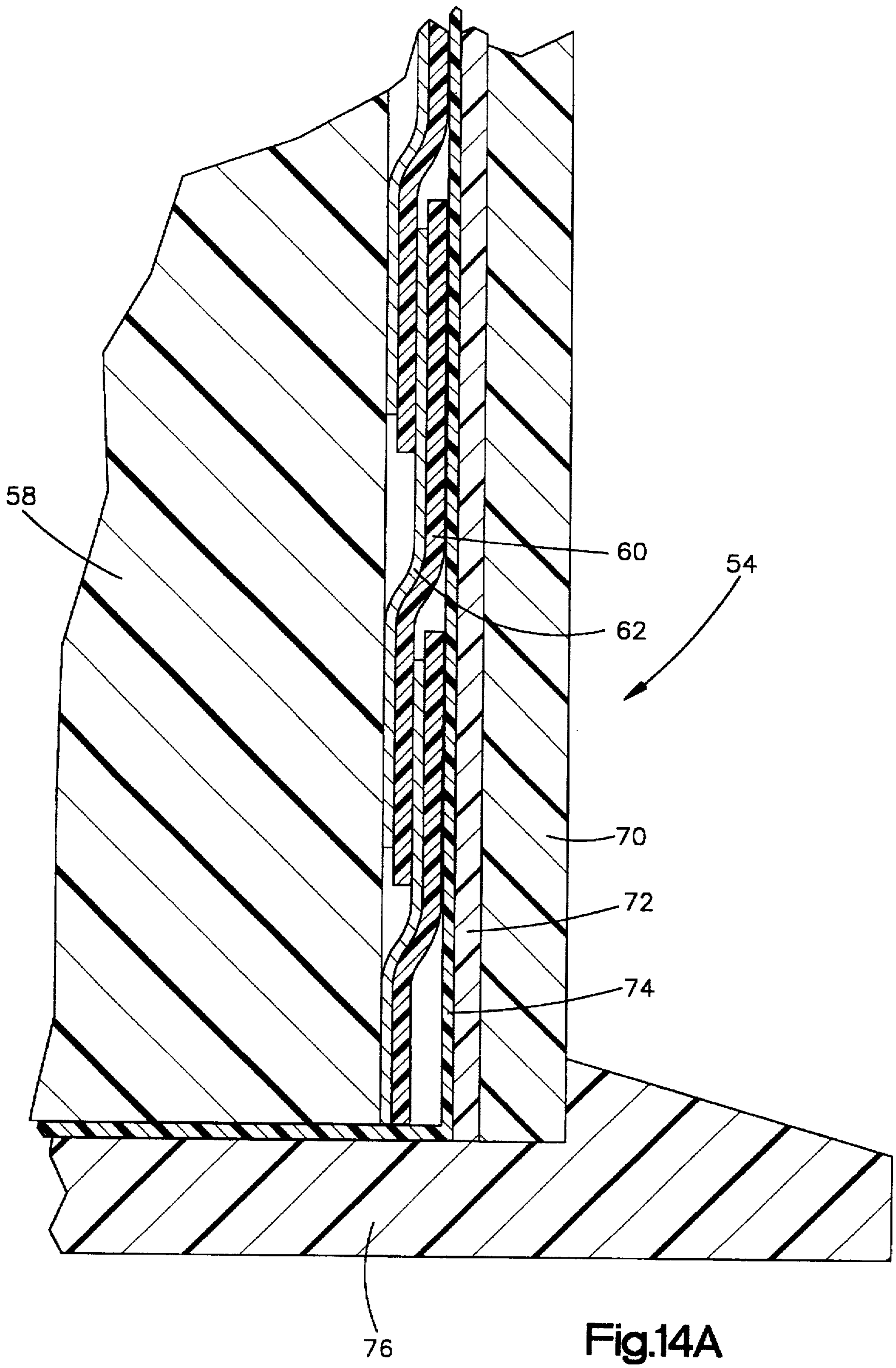
FIG. 14A is an enlarged partial cross-sectional side view of the dispenser and cover of FIG. 14.

For example, referring now to FIGS. 13 and 14, a dispensing unit 50 is illustrated which is constructed according to an additional embodiment of the present invention. The dispensing unit 50 includes a dispenser 52 and a cover 54 therefor. The dispenser 52 and cover 54 are designed to be heated in a microwave oven, such as depicted in FIG. 1. After being heated in a microwave oven, the dispensing unit 50 can be used to apply hot melt adhesive.

The dispenser 52 includes a first material 58 to be dispensed, a second material 60 in a heat transfer relationship with the first material 58, and an outlet 59 through which the first material 58 can be dispensed.

As in the previous embodiment, the first material 58 is capable of changing from a solid state or a state of high viscosity to a state of low viscosity when heated above a predetermined temperature, and is preferably a hot melt adhesive such as described previously, although non-adhesives can also be used with the present invention.

The second material 60, which is in a heat transfer relationship with the first material 58, comprises a susceptor which is adapted to be heated above a predetermined temperature when subjected to microwaves for at least a predetermined period of time. Susceptors for use in a dispenser according to the second embodiment of the invention can have an optical density in the range of 0.05 to 2.00, which is a standard commercial range. Preferably, a susceptor for use in the second embodiment of the present invention has an optical density of between 0.10 and 0.35.

According to one form of the second embodiment, the susceptor comprises particles deposited on the surface of a thin (48 gauge) microwave transparent outer sheet 61 of, e.g., polyester film. A commercially available polyester film appropriate for the outer sheet 61 is manufactured and sold by a variety of suppliers such as National Metallizing Corporation in Cranberry, N.J. However, other materials can also be used for the outer sheet, such as Kapton, a commercially available polyimide film sold by E. I. dupont de Nemours & Co.; thermoplastic polymers or plastics; or synthetic resins. The susceptor is preferably formed in one layer, however it is to be understood that multiple layers could also be used.

Further, the susceptor particles preferably comprise aluminum particles, although other particles capable of absorbing microwave energy and converting the microwave energy to heat can also be used, e.g., stainless steel particles, ferrite particles, ceramic spheres or carbon particles such as carbon fibers, graphites, carbon blacks or carbon black pigments. In any case, the particles should be able to be heated in a microwave oven to a temperature above the melting temperature of the hot melt adhesive or other material to be heated.

The susceptor 60 is applied using high temperature adhesive (e.g., Avery 1184) to a microwave transparent inner sheet 62 of e.g., polyimide film. A commercially available polyimide film appropriate for the inner sheet is manufactured and sold by E. I. du Pont de Nemours & Co. under the mark/designation Kapton. Again, it is within the scope of the present invention to use other high-temperature material for the inner sheet, e.g., Kapton, thermoplastic polymers or plastics, or synthetic resins, such as described previously. In any case, the inner sheet 62 provides a stable, high temperature backing for the outer sheet 61.

The outer microwave transparent sheet 61 and the inner microwave transparent sheet 62 are then spirally wound together around the first material 58 to form a container for the first material, e.g., a tube or sleeve, with the outer sheet 61 located on the outer surface of the container, and the microwave absorbing particles preferably located on the outer surface of the outer sheet 61. Alternatively, the inner microwave transparent sheet 62 can be first spirally wound around the first material 58, and then the outer sheet 61 can be folded widthwise around the entire length of the inner microwave transparent sheet to form a container. In this case, the susceptor 60 does not overlap along the edges and thus "hot spots" are prevented from occurring along the length of the dispenser. Still further, the susceptor particles can be deposited directly onto the outer surface of the inner microwave transparent sheet 62 and this single sheet can then be spirally wound into a tube around the first material 58 to form a container. In any case, a high temperature adhesive (e.g., Avery 1184) is applied between any overlapping edges of the sheet(s) to adhesively secure the sheets together.

Figure 15:
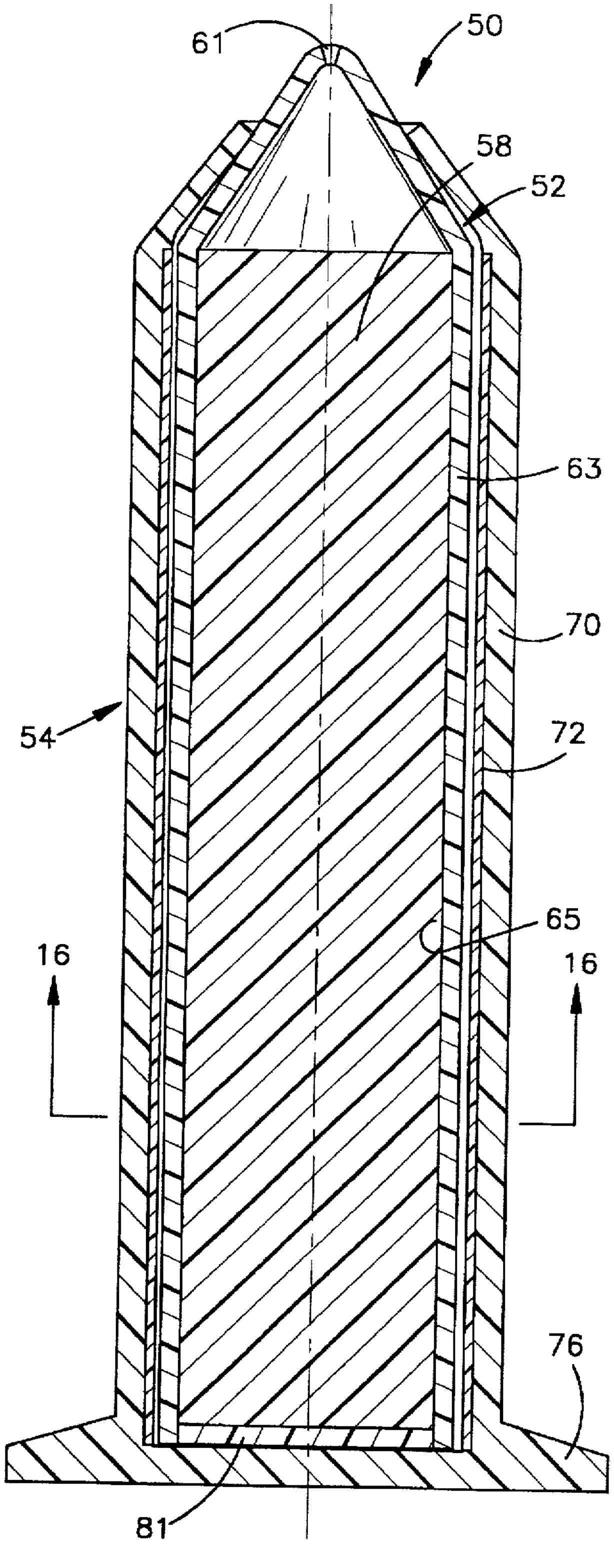
FIG. 15 is a cross-sectional side view of a dispenser and cover similar to that shown in FIG. 14, but showing the dispenser constructed according to an additional form of the present invention.
Figure 16A:
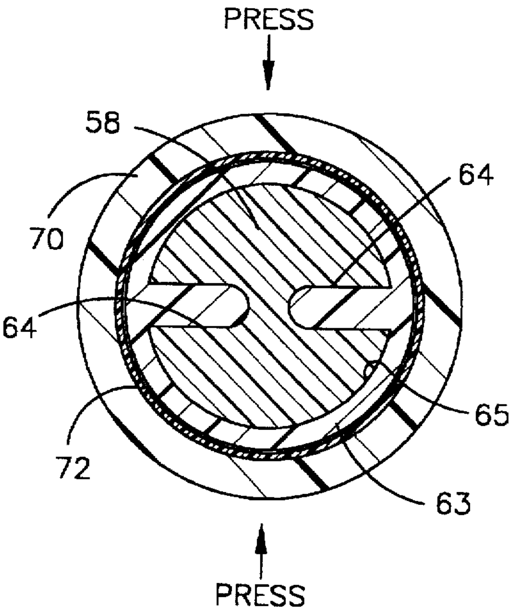
FIG. 16A is a cross sectional top view of the dispenser of FIG. 15, but showing a pair of ribs extending radially inward along opposite sides of the silicone tube.
Figure 16:
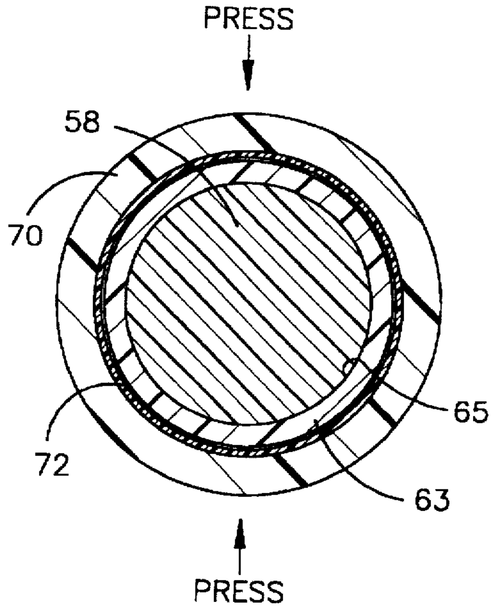
FIG. 16 is a cross sectional top view of the dispenser of FIG. 15 taken along the line 16—16.

Alternatively, according to another form of the second embodiment illustrated in FIGS. 15 and 16, the susceptor comprises particles dispersed or embedded in a silicone tube 63. The silicone tube forms a container for the hot melt adhesive 58. The silicone tube is formed from injection-molding grade silicone rubber capable of withstanding high temperatures, and is commercially available from various suppliers, for example Ronsil Rubber of Blackstone, Va. The particles are dispensed or embedded within the silicone during fabrication of the tube. The particles disposed in the silicone tube 63 can comprise the particles described previously, i.e., aluminum particles, stainless steel particles, carbon particles, ceramic spheres, etc. However, the particles preferably comprise a nickel-zinc or manganese-zinc ferrite, although other types of ferrites could be used, such as strontium or barium, or any other ferrite having a Curie point of between about 70 degrees and 400 degrees centigrade (although the Curie point could vary depending on the type of adhesive or non-adhesive material being heated in the microwave). Preferably, the silicone tube contains 10% to 50% ferrite particles by weight, with the higher the percentage of ferrite particles, the higher the temperature achieved during microwave heating. During heating in the microwave oven, the particles transfer heat through the silicone tube to heat the adhesive material beyond its melting temperature into a flowable state.

The silicone tube is molded with a generally round shape which narrows toward its open end to the outlet 61. The wall thickness of the tube is between 0.010–0.125 inches, with the thicker the wall, the higher the temperatures achieved during microwave heating. The tube can be molded with one or more flanges or ribs extending down the inside surface of the tube. For example, as illustrated in FIG. 16A, the tube can include a pair of ribs 64 located on radially opposite sides of the tube to provide additional surface area within the tube for heating the hot melt adhesive. The location of the ribs 64 on opposite sides of the tube enables the user to squeeze the tube at angles substantially perpendicular thereto (see arrows) to dispense the hot melt adhesive product through outlet 59.

Figure 17:
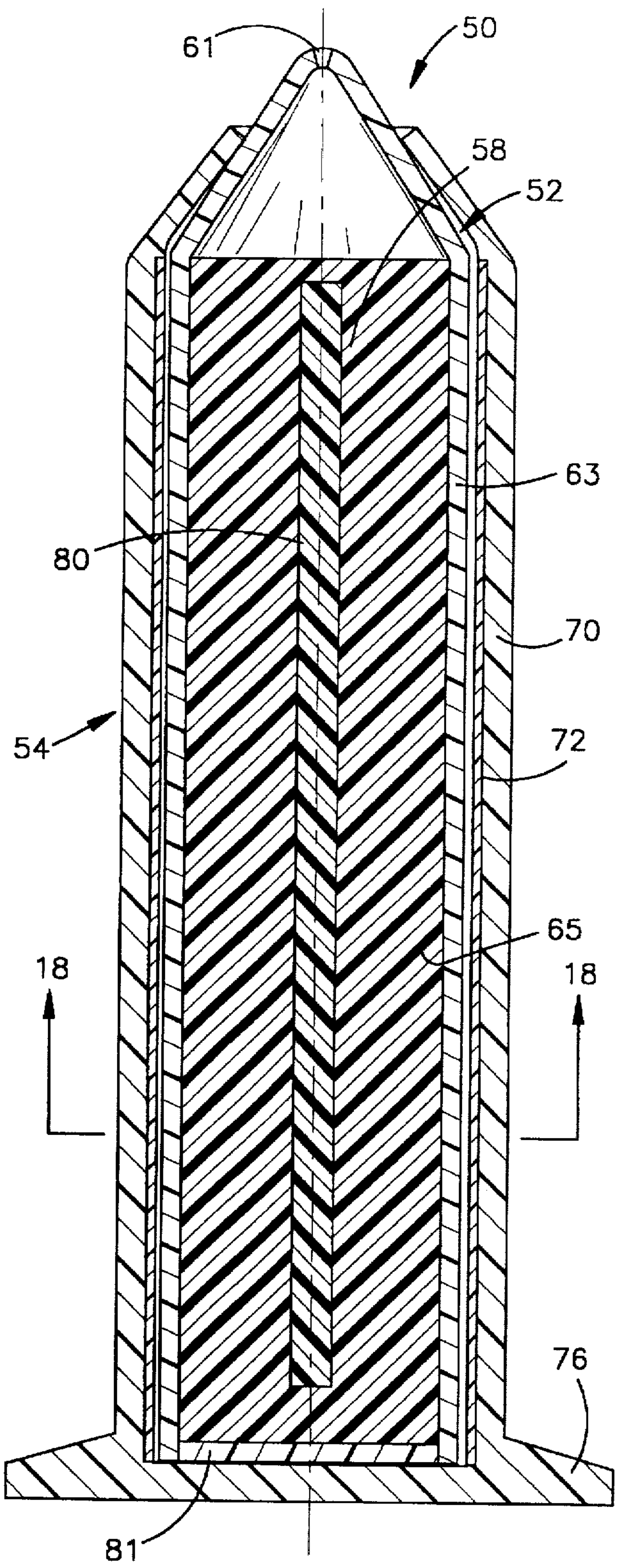
FIG. 17 is a cross-sectional side view of a dispenser and cover similar to that shown in FIG. 15, but showing a heating stick located within the dispenser.
Figure 18:
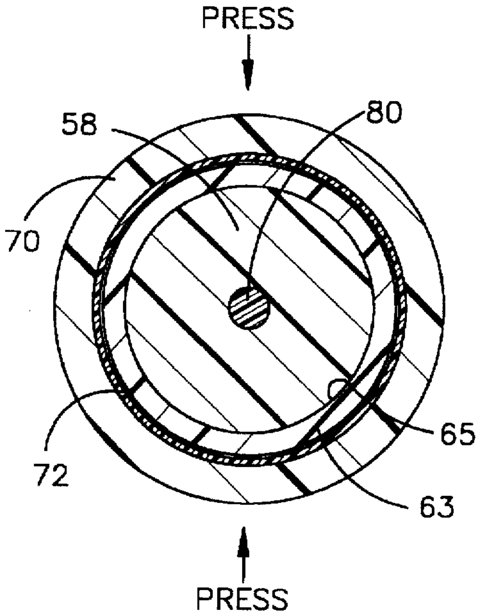
FIG. 18 is a cross-sectional top view of the dispenser of FIG. 17 taken along the line 18—18.

Further, as illustrated in FIGS. 17 and 18, a heating rod 80 can be located within the dispenser 50 to facilitate heating the hot melt adhesive, rather than the flanges or ribs 64. Heating rod 80 can comprise a silicone rod with susceptor particles embedded therein which is located centrally in the hot melt adhesive. The silicone rod can be formed from the same susceptor materials and in the same manner as described previously with respect to the silicone tube 63. The heating rod extends lengthwise in the dispenser and transfers heat energy to the hot melt adhesive when subjected to microwave energy. In this case, it is not required that the outer silicone tube have susceptor particles embedded or dispersed therein. Rather, the central heating rod 80 can be the primary source of heating for the hot melt adhesive in the tube. The central location of the heating rod does not interfere with squeezing the tube to dispense the hot melt adhesive, while the diameter of the rod is such that the rod will be prevented from passing through the outlet 61.

The hot melt adhesive for the second embodiment can be a commercially available hot melt adhesive formed into a round, elongated solid stick. The microwave-transparent sheets can be wound around the solid stick (e.g., as shown in FIGS. 13, 14); or the stick can be inserted into the open end of the silicone tube (e.g., as shown in FIG. 15).

Alternatively, in the case of the silicone tube, the adhesive can be poured in a molten state into She open end of the tube. In this case, the molten adhesive will conform substantially to the inner walls 65 of the tube 63 and thus prevent air pockets from being created, which have a tendency to lengthen the heating process. Moreover, in the case of a silicone tube with an inner flange or rib structure, or a dispenser with a heating rod extending centrally in the tube, the molten adhesive will mold around the flange, rib structure or heating rod, thus providing greater surface area in direct contact with the adhesive to facilitate heating.

Finally, a plug or end cap 81 is formed over the open end of the silicone tube to seal the end of the tube and prevent hot melt adhesive from flowing out of the rear end of the tube during the heating process or during application thereafter. Alternatively, the end of the silicone tube could be heat crimped together or closed by other means. The flexibility and resiliency of the sealed silicone tube acts as a pneumatic pumping device when the tube is squeezed to dispense the molten adhesive.

In the second embodiment of the invention, the outlet 61, through which the first material 58 is dispensed, preferably forms a nozzle. Because the nozzle is open to ambient air, the nozzle can have a thicker wall than the remainder of the tube to increase the absorbed heat in the nozzle area. However, as described previously, other forms of outlets may also be suitable, such as for example, a spout. Preferably, the nozzle is formed from a high temperature material e.g., silicone, and susceptor particles coat the entire outside surface of the nozzle 61; or alternatively, in the case of the silicone tube, are embedded or dispersed therein. Coating or embedding the nozzle 61 with the susceptor particles also helps maintain heat in the nozzle 61 for a period of time after the dispenser 52 has been heated in a microwave oven 16 (FIG. 1) and melts any adhesive which has "clogged" the nozzle from previous usage. Preferably, the adhesive is filled only to the top of the container (to the mid-portion of the nozzle) during the manufacturing process.

The nozzle 61 is attached to the rest of the susceptor structure by wrapping the sheet(s) of microwave transparent material around the end of the nozzle as the sheets are wound into the tube (see e.g., FIGS. 13, 14); or in the case of the silicone tube, the nozzle is formed in one piece with the tube (see e.g., FIGS. 15, 16). Appropriate high-temperature adhesive (e.g., Avery 1184) can also be used to attach the nozzle to the tube if necessary.

The cover 54 of the dispensing unit comprises one or more layers of heat insulating material which permit a user to grasp the cover and remove the cover and the dispensing unit from the microwave oven after heating. For example, as illustrated in FIGS. 13 and 14, the cover comprises an outer insulating sheath 70, an intermediate insulating layer 72, and an inner insulating layer 74. The outer insulating sheath 70 can include serrations or grooves (not shown) to facilitate heat dissipation and grasping by a user, and is preferably formed of flexible, heat insulating material, such as cross-linked polyethylene, polypropylene, polyimide, or polystyrene foam. Such a foam suitable for the present invention is a well known product and is commercially available from numerous sources. Other materials with flexible, resilient insulation capable of withstanding approximately 500F. degree heat for a period of time in a microwave oven could also be used for the outer insulating sheath 70 (e.g., Kapton).

Similarly, the inner insulating layer 74 and intermediate insulating layer 72 are also formed from flexible, resilient, heat insulating material. For example, the inner insulating layer 74 is formed in the shape of a tube from fiberglass, injection molded high temperature plastic with imbedded fiberglass, or from molded silicone. The intermediate insulating layer 72 can likewise be formed from material such as non-woven fiberglass, although other appropriate high temperature materials such as described previously are also appropriate for the inner and intermediate insulating layers.

Alternatively, with the dispensing unit of FIGS. 15 and 16, the cover 54 can comprise an outer insulating sheath 70, with a single intermediate insulating layer 72 located between the outer sheath 70 and the container. The outer sheath 70 and intermediate layer 72 can be formed from the heat-insulating materials described previously. Moreover, with this type of dispensing unit, the silicone tube could also be molded with lengthwise extending ribs (not shown) on the outer surface. These exterior ribs provide an insulating air space between the tube and the insulating layers; minimize contact with the insulating layers; increase surface area and thus maximize microwave absorption; and increase the rigidity of the tube to facilitate manufacturing.

As indicated above, the cover 54 can be formed in one or more layers to provide an insulating layer between the hot melt adhesive and the user. The overall cover structure must have insulating properties which prevent the user's hand from burning when the user is handling the dispenser after it has been heated in the microwave oven. It should therefore be apparent to those skilled in the art that a single insulating layer could also be used for the cover 54 if these conditions are met, rather than the multi-layered structures described above.

Figure 15A:
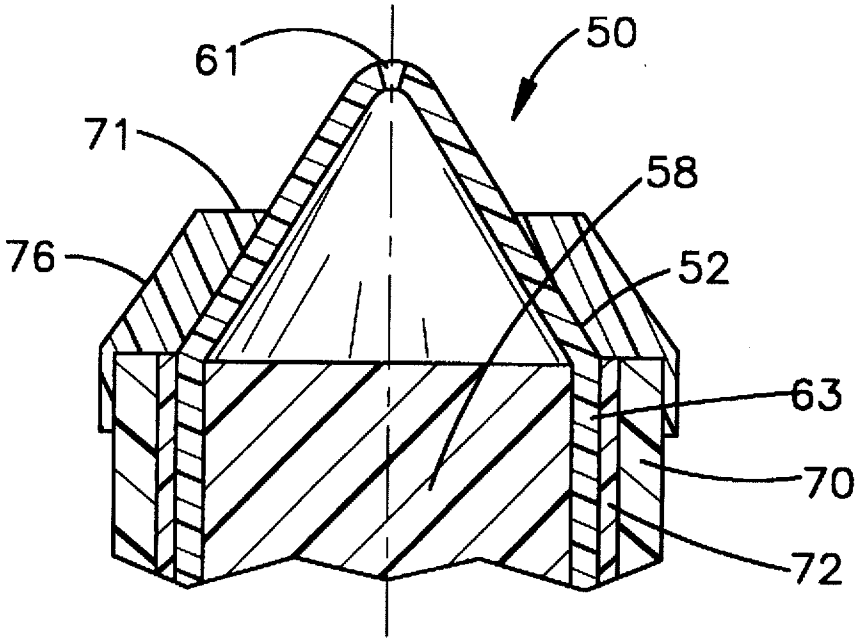
FIG. 15A is a partial cross-sectional side view of the dispenser and cover of FIG. 14, but showing a cap attached to the top of the cover.

Further, if necessary, the cover can extend upwardly along the sides of the nozzle 61 (see, e.g., FIG. 15) to provide additional insulation; collect drippings; prevent the container from falling out of the cover; prevent burning of the user's fingers; and provide an overall finished appearance. Alternatively, as illustrated in FIG. 15A, a separate high temperature plastic cap 75 made from e.g., silicone or polypropylene, could encircle the top of the dispenser and be adhesively secured thereto to also provide these benefits. In this case, the nozzle of the container can extend through an aperture 77 in the cap.

The flexibility and resiliency of the cover provides a sturdy construction, yet is pliable enough to enable a user to squeeze the cover and cause deformation of the inner susceptor structure to dispense the adhesive product through the nozzle. Moreover, the cover 54 can have a base 76 molded separately or in one piece with the outer insulating sheath 70 to support the dispenser 12 in an upright orientation (nozzle pointed upward) while the dispenser is being heated in the microwave oven 16. If molded separately, the base can be formed from other heat-resistant materials, e.g., silicone or polypropylene., Further, the base 76 can be removably attached to the cover 54, such as by a hinge or a threaded connection (not shown), to allow replacement tubes of hot melt adhesive to be inserted into the bottom of the cover for re-use of the dispenser. Hence, the cover provides the dual function of containing the hot melt adhesive and susceptor, as well as supporting the dispenser in an upright orientation in the microwave oven.

Again, with hot melt adhesive, it is believed important to leave the nozzle 61 uncovered, so that the hot melt adhesive can be readily applied to an object after the adhesive is heated and to avoid buildup with pressure. Maintaining the dispenser 52 in an upright orientation prevents hot melt adhesive from dripping from the dispenser during the heating process. However, the outer insulating layer 70 can also be formed slightly higher than the intermediate insulating layer 72, such that any dripping of the hot melt adhesive from the nozzle 61 is contained within the intermediate insulating layer and prevented from dripping down the outer surface of the cover.

As discussed previously, a dispenser according to the second embodiment of the invention is preferably designed to heat hot melt adhesive. The particular time that may be required to heat the dispenser in a microwave will depend on factors such as (i) the amount of hot melt adhesive in the dispenser, (ii) the optical density (or efficiency) of the susceptor, and (iii) the power of the microwave oven, such as described previously.

As described above, the present invention provides a new approach to the concept of hot melt adhesive dispensers, in which the dispenser is disposable, small, relatively inexpensive, reusable and capable of being heated in a microwave oven. The dispenser, in general, includes a first material and a second material disposed within a container. As described in the particular embodiments, the second material comprises a susceptor which can surround the first material either as one (or more) layers of film, or as a silicone tube in which the susceptor is dispersed or embedded in the tube. In any case, the dispenser enables the hot melt adhesive to be heated in a microwave until the hot melt adhesive achieves a state of low viscosity, and then dispensed through a nozzle in the dispenser. However, with the above in mind, the present invention is intended to cover all devices incorporating the concepts of the present invention as defined within the appended claims.

We claim:

1. Apparatus for dispensing hot melt adhesive, comprising:

(i) a first material comprising a hot melt adhesive, (ii) a second material which is designed to be heated above a predetermined temperature when subjected to microwaves for at least a predetermined period of time, said second material also being in a heat transfer relationship with said first material, (iii) a container enclosing said first material and said second material, and (iv) an outlet through which said first material can be dispensed from said container when in a state of low viscosity.

2. The apparatus of claim 1 wherein said second material comprises a susceptor.

3. The apparatus of claim 2 wherein said outlet comprises a nozzle.

4. The apparatus of claim 3 wherein said second material is disposed within said nozzle to maintain heat in said nozzle for a period of time after said dispensing apparatus is subjected to microwaves.

5. The apparatus of claim 4 wherein said second material surrounds at least a portion of said first material.

6. The apparatus of claim 5 wherein said second material forms an inner coating for said container.

7. The apparatus of claim 6 wherein said second material forms an inner coating for said nozzle.

8. The apparatus of claim 7 wherein a cover surrounds a selected portion of said dispensing apparatus, said cover comprising a heat insulating material.

9. The apparatus of claim 8 wherein said cover has a configuration which enables said dispensing apparatus to be maintained in an upright position while in a microwave oven.

10. The apparatus of claim 9 wherein said cover comprises a relatively rigid length of material having an integral hinge structure formed in a central portion thereof, the relative rigidity of said material enabling said cover to be maintained on a surface in an inverted "V" shaped position, said cover having a central portion with an opening extending therethrough to allow said nozzle of said dispensing apparatus to fit therethrough, thereby enabling said dispensing apparatus to be maintained in an upright orientation when said cover is supported on a surface in an inverted "V" shaped position, said hinge structure enabling portions of said cover to be squeezed against said dispensing apparatus to dispense said first material therefrom.

11. The apparatus of claim 5 wherein a cover surrounds a selected portion of said dispensing apparatus, said cover comprising a heat insulating material.

12. The apparatus of claim 11 wherein said cover has a configuration which enables said dispensing apparatus to be maintained in an upright position while in a microwave oven.

13. The apparatus of claim 12 wherein said cover comprises a relatively rigid length of material having an integral hinge structure formed in a central portion thereof, the relative rigidity of said material enabling said cover to be maintained on a surface in an inverted "V" shaped position, said cover having a central portion with an opening extending therethrough to allow said nozzle of said dispensing apparatus to fit therethrough, thereby enabling said dispensing apparatus to be maintained in an upright orientation when said cover is supported on a surface in an inverted "V" shaped position, said hinge structure enabling portions of said cover to be squeezed against said dispensing apparatus to dispense said first material therefrom.

14. The apparatus of claim 1 wherein a cover surrounds a selected portion of said dispensing apparatus, said cover comprising a heat insulating material.

15. The apparatus of claim 14 wherein said cover has a configuration which enables said dispensing apparatus to be maintained in an upright position while in a microwave oven.

16. The apparatus of claim 15 wherein said cover comprises a relatively rigid length of material having an integral hinge structure formed in a central portion thereof, the relative rigidity of said material enabling said cover to be maintained on a surface in an inverted "V" shaped position, said cover having a central portion with an opening extending therethrough to allow said nozzle of said dispensing apparatus to fit therethrough, thereby enabling said dispensing apparatus to be maintained in an upright orientation when said cover is supported on a surface in an inverted "V" shaped position, said hinge structure enabling portions of said cover to be squeezed against said dispensing apparatus to dispense said first material therefrom.

17. The apparatus of any of claim 1 wherein a third material is disposed within said container between said first material and said second material, said third material physically separating said first material and said second material while allowing heat transfer therebetween.

18. The apparatus of claim 17 wherein said third material forms an inner coating for said container.

19. The apparatus of claim 18 wherein said third material forms an inner coating for said nozzle.

20. The apparatus of claim 1, wherein the second material is separate from said container.

21. Apparatus for dispensing hot melt adhesive, comprising:

(i) a first material comprising a hot melt adhesive, said first material being normally in a solid state or a state of high viscosity, (ii) a second material which is designed to be heated above a predetermined temperature when subjected to microwaves for at least a predetermined period of time, said second material also being in a heat transfer relationship with said first material, (iii) a container structure enclosing said first and second materials, and (iv) an opening through which said first material flows from said container structure when in a state of low viscosity.

22. The apparatus of claim 21, wherein said second material comprises a susceptor.

23. The apparatus of claim 22, wherein said susceptor surrounds at least a portion of said first material.

24. The apparatus of claim 23, wherein said susceptor forms an inner layer for said container structure.

25. The apparatus of claim 21, wherein said opening comprises a nozzle.

26. The apparatus of claim 25, wherein said second material is disposed within said nozzle to ensure sufficient heat in said nozzle for a period of time after said dispensing apparatus is subjected to microwaves.

27. The apparatus of claim 26, wherein said susceptor forms an inner coating for said nozzle.

28. The apparatus of claim 21, wherein a cover surrounds a selected portion of said dispenser, said cover comprising a heat insulating material.

29. The apparatus of claim 28, wherein said cover includes a base which enables said dispensing apparatus to be maintained in an upright position while in the microwave oven.

30. The apparatus of claim 29, wherein said cover comprises a relatively flexible Structure of heat insulating material having a configuration which prevents adhesive flowing out of said nozzle from flowing down the outer surface of said cover when said dispensing apparatus is being heated in the microwave oven in a vertical orientation.

31. The apparatus of claim 21 wherein said second material is dispersed within said container structure.

* * * * *